July 18, 1933.  P. S. BEAR  1,918,583
FISHING ROD
Filed April 8, 1932
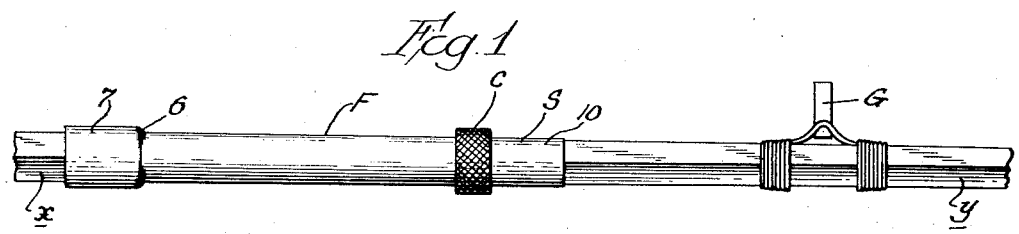
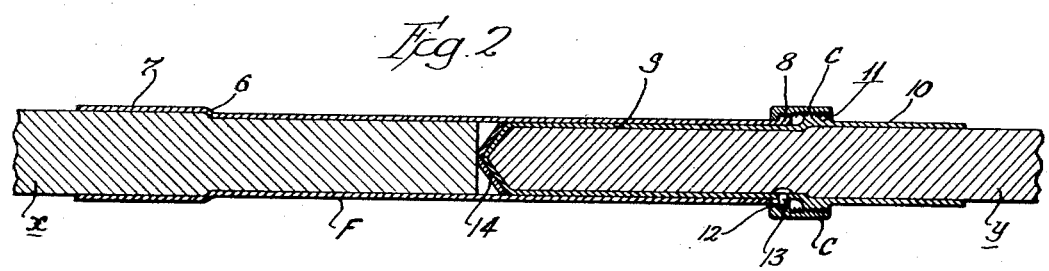
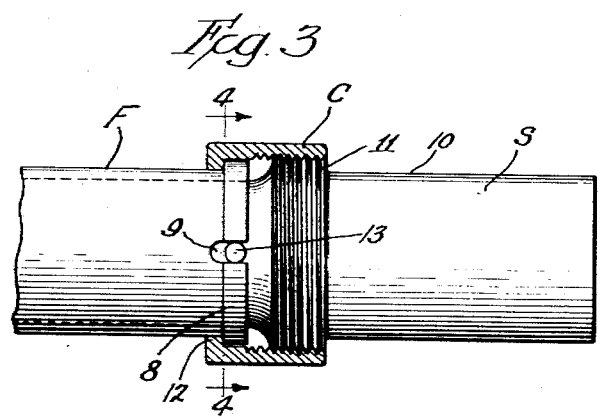
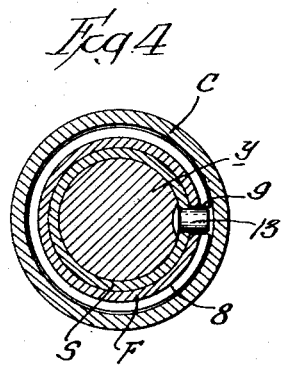
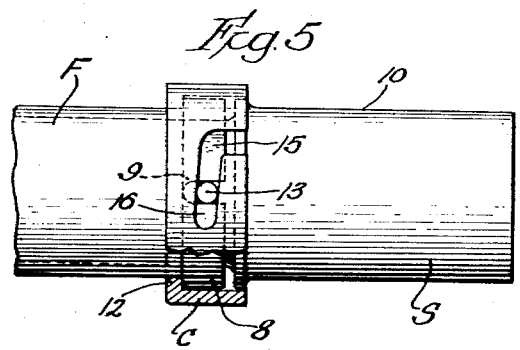
Inventor:
Paul S. Bear Patented July 18, 1933

1,918,583

UNITED STATES PATENT OFFICE

PAUL S. BEAR, OF DOWAGIAC, MICHIGAN, ASSIGNOR TO JAMES HEDDON'S SONS, OF DOWAGIAC, MICHIGAN, A CORPORATION OF MICHIGAN

FISHING ROD

Application filed April 8, 1932. Serial No. 603,933.

This invention relates to a fishing rod having jointed sections, and is concerned particularly with certain improvements in the joint itself by which (1) to maintain the rod sections in a proper rotative adjustment, (2) to maintain the rod sections together in perfect axial alignment, and (3) to provide for free connection or disconnection of the rod sections without frictional resistance. In accomplishing these objects the present rod joint is advantageous also in its simplicity, strength and low cost of manufacture.

A suggestive embodiment of this invention is set forth in the accompanying drawing wherein—

Figure 1 is a view in elevation of the jointed part of a fishing rod;

Fig. 2 is an enlarged longitudinal section through the jointed parts of the rod;

Fig. 3 is a further enlarged view in elevation of the rod joint with the locking collar shown in section;

Fig. 4 is a transverse section on line 4 of Fig. 3; and

Fig. 5 is a view in elevation of a modified form of locking collar.

The present construction is applicable to a fishing rod having two or more sections $x$, $y$, made from metal, bamboo, or other suitable material. As shown, the end of one rod section $x$ mounts a ferrule F which is applied thereover and beyond to provide a socket. The ferrule which is connected inseparably and immovably to the rod end in any suitable manner may be of one diameter throughout most of its length, and is shouldered at 6 beyond which the ferrule is slightly enlarged as at 7 to conform with a like surface configuration of the rod. The opposite end of the ferrule is flanged outwardly to provide an annular head 8 wherein is a longitudinal slot 9 opening on to the ferrule end.

The co-operating rod section $y$ carries a slide S which is in the general form of a thimble adapted to be applied over and secured immovably to the end of this rod section. The slide may be of slightly enlarged diameter as at 10 in the region away from the rod end to conform to a like surface configuration of the rod. At a point intermediately of its two ends the slide body is enlarged at 11 and formed exteriorly with screw threads. This enlargement stands out beyond the adjacent cylindrical surfaces of the slide and is adapted to receive threaded engagement from a collar C which is shiftably mounted on the ferrule. This collar is provided with an inturned flange 12 closely surrounding the ferrule and adapted to co-act with its shoulder 7 and head 8 to limit the collar movements upon the ferrule. With the threads of the collar and slide head interengaged, a continued rotation of the collar relative to the slide will act to draw the ferrule further upon the slide to a distance which is determined by means to be presently explained.

The slide carries a pin 13 which projects outwardly a slight distance, but not enough to interfere with positioning of the collar thereover, as indicated in Fig. 2. This pin is adapted for reception within the slot 9 at the end of the ferrule, but for a distance less than the full length of the slot. When so positioned the two rod sections are locked against rotative movement. By means of the pin and slot, the rod sections may be positioned in such rotative relation that the line guides G will be brought into alignment and there maintained.

The rod section to which the slide is fitted preferably terminates in a convexed end or cone having an obtuse angle. The slide end which fits over the cone is of like conformation. The diameter of the slide in relation to the internal diameter of the ferrule is such that these parts may interfit with little or no frictional resistance. Such a loose connection, however, is inadequate to maintain the rod sections fixedly in alignment, hence other means are provided for this purpose. As shown, I have fitted into the ferrule a concaved or wide angled cone shaped shoe 14 which rests at the bottom of the socket therein. This shoe is of such size as to remain immovably in position, and by preference conforms exactly to the cone end of the slide which, when brought to final position within the socket, thrusts its cone end into the shoe, thereby centering the connected rod sections in perfect axial alignment. When the slide is further pressed toward the ferrule by rotative advance of the collar upon the threads of the head 11, the interfitting of the rod sections becomes tight for all purposes, although there may be no actual measurable frictional contact between the cylindrical walls of the slide and sleeve. The centering of the conical end of the slide within the shoe at the bottom of the socket, plus the centering of the slide upon the outer end of the socket by the collar which serves as a connection at this point, furnishes an immovable and axially non-deflectable connection between the rod sections so joined.

In the modified construction suggested in Fig. 5, the ferrule and slide are exactly the same, and accordingly carry reference numerals corresponding to those in the remaining figures. The collar, however, is not interiorly threaded, nor have I provided any screw threads exteriorly of the slide. Instead I utilize an equivalent connection comprising a bayonet slot 15 opening on to the collar end opposite that on which the flange 12 is formed, this slot having a pitched lateral branch 16 similar to that of a screw thread. With such a bayonet slot the pin 13, (or any supplementary pin) is adapted to engage and co-act in forcing the slide end into tight engagement with the shoe at the bottom of the socket in the ferrule.

In producing a rod joint of the kind described care is taken (1) to provide a relatively frictionless fit between the slide and ferrule, (2) to so form and position the shoe that it will provide an axial seat, (3) to arrange the cone end of the slide for exact centering within the shoe, (4) to provide stops by which to limit endwise shifting of the collar upon the ferrule, (5) to so fit the collar over the ferrule head that these parts will remain in axial alignment, and (6) to so locate the pin relative to the slot and end of the slide as to permit full advance of the collar upon the threaded slide, with consequent thrust of its cone end against the shoe, free of any interference. The locking of the rod sections is performed by the threaded connection between the collar and slide, but the maintenance of axial alignment and non-rotation between the rod sections is accomplished by other means in which the locking collar is only one element. Manifestly, such a joint as is herein described is easy and simple to make and connect or disconnect, and assures the maintenance of a firm, non-rotative true axial alignment of the rod sections so joined.

I claim:

A jointed fishing rod comprising one rod section to which is applied a fitting in the form of a projecting ferrule providing a socket, and a second rod section to which is applied a fitting in the form of a slide adapted for a relatively frictionless fit within the socket, a convexed end on the slide and a concaved shoe at the bottom of the socket adapted to center the slide when positioned therewithin, cooperating means on the two fittings interengaging when the slide is advanced within the socket adapted to maintain the associated rod sections in a definite rotative relationship, a rotatable collar slidable upon one fitting and engageable with the other fitting to force one longitudinally of the other, and retain the convexed end of the slide in positive engagement with the shoe, and a stop for limiting endwise movement of the collar in a direction which forces the slide to the bottom of the socket when the collar is rotatively advanced.

PAUL S. BEAR.